United States Patent [19]

Muller

[11] 4,402,016

[45] Aug. 30, 1983

[54] APPARATUS FOR THE PHOTOGRAPHIC RECEPTION OF IMAGES TRANSMITTED BY MEANS OF A MODULATED ELECTRICAL SIGNAL

[75] Inventor: Christian Muller, Le Landeron, Switzerland

[73] Assignee: Compagnie Industrielle Radioelectrique, Switzerland

[21] Appl. No.: 256,040

[22] Filed: Apr. 21, 1981

[30] Foreign Application Priority Data

Jun. 16, 1980 [CH] Switzerland ............... 4607/80

[51] Int. Cl.³ .................. H04N 1/04; H04N 1/40
[52] U.S. Cl. ..................... 358/280; 358/287
[58] Field of Search ..................... 358/280, 287

[56] References Cited

U.S. PATENT DOCUMENTS 4,318,134 3/1982 Partridge .................. 358/287

Primary Examiner—George G. Stellar
Attorney, Agent, or Firm—Robert E. Burns; Emmanuel J. Lobato; Bruce L. Adams

[57] ABSTRACT

The apparatus comprises a laser providing a beam of modulated intensity which sweeps a photo-sensitive sheet driven by a stepping motor. An analog signal received by the apparatus is demodulated and sampled, the samples representing elementary points. These samples are transformed into digital signals and memorized in two memories connected in tandem. A line of points is recorded once and reproduced 2.n times, an image point being constituted by the repetition of 2 times $2\frac{1}{2}$ elementary points. The signals memorized are retransformed into analog signals for the modulation of the laser. An enlargement may be obtained by the repetition of each elementary point and of each line.

3 Claims, 3 Drawing Figures

APPARATUS FOR THE PHOTOGRAPHIC RECEPTION OF IMAGES TRANSMITTED BY MEANS OF A MODULATED ELECTRICAL SIGNAL

The present invention relates to an apparatus for the photographic reception of images transmitted by means of a modulated electrical signal, comprising a laser providing a beam of modulated intensity and means for sweeping the beam across a photo-sensitive sheet entrained by a stepping motor.

An apparatus of this type has been developed by the company Dr.-Ing. Rudolf Hell GmbH under the trade name TM 4006. This apparatus has been developed for the police for the transmission of photographs, fingerprints and results of searches. If one wished to alter the size of the image, for example in order to obtain an enlargement, in an apparatus of this type it would be necessary to modify not only the optical system, but all the fixed data for the correction of the laser beam, such as corrections of the distortion and of the intensity. This feature is common to all known installations for the automatic photographic reception of images.

It is an object of the present invention to enable the user, if he so desires, to enlarge one part, amongst others, of the image received, without it being necessary to modify the adjustment of the optical system of the receiver or the adjustments of the laser beam.

According to the present invention there is provided apparatus for the photographic reception of images transmitted by means of a modulated electrical signal, comprising means for receiving and demodulating the electrical signal to provide an analog signal, a laser providing a beam of modulated intensity, and means for sweeping the beam across a photo-sensitive sheet driven by a stepping motor, characterised by means for sampling the analog signal to obtain samples representing elementary points, means for converting the samples into digital signals defining elementary points, memories for storing the digital signals, means for reading the stored digital signals from the memories, means for converting the read out digital signals into analog signals representing elementary points, means for modulating the laser with the analog signals representing elementary points, and means for repeating the elementary points.

Thus one selects the resolution at the outset and, working with digital signals, an image area is composed from a plurality of elementary points. The enlargement of the image is achieved by the repetition of elementary points and lines.

The apparatus according to the invention is above all intended for the photographic reception of images transmitted by meteorological satellites. In this application, the image area is composed of two times 2½ points forming approximately a square corresponding approximately to the round spot of the observation beam of the satellite. The repetition n times of each elementary point and 2.n times of each line makes it possible to obtain an enlargement of n times. The use of two direct access memories operating in tandem, one filling up whilst the other is read and vice versa, makes it possible to repeat the stored digital information as many times as necessary.

The accompanying drawings show, by way of example, one embodiment of the invention. In the drawings.

Figure 1:
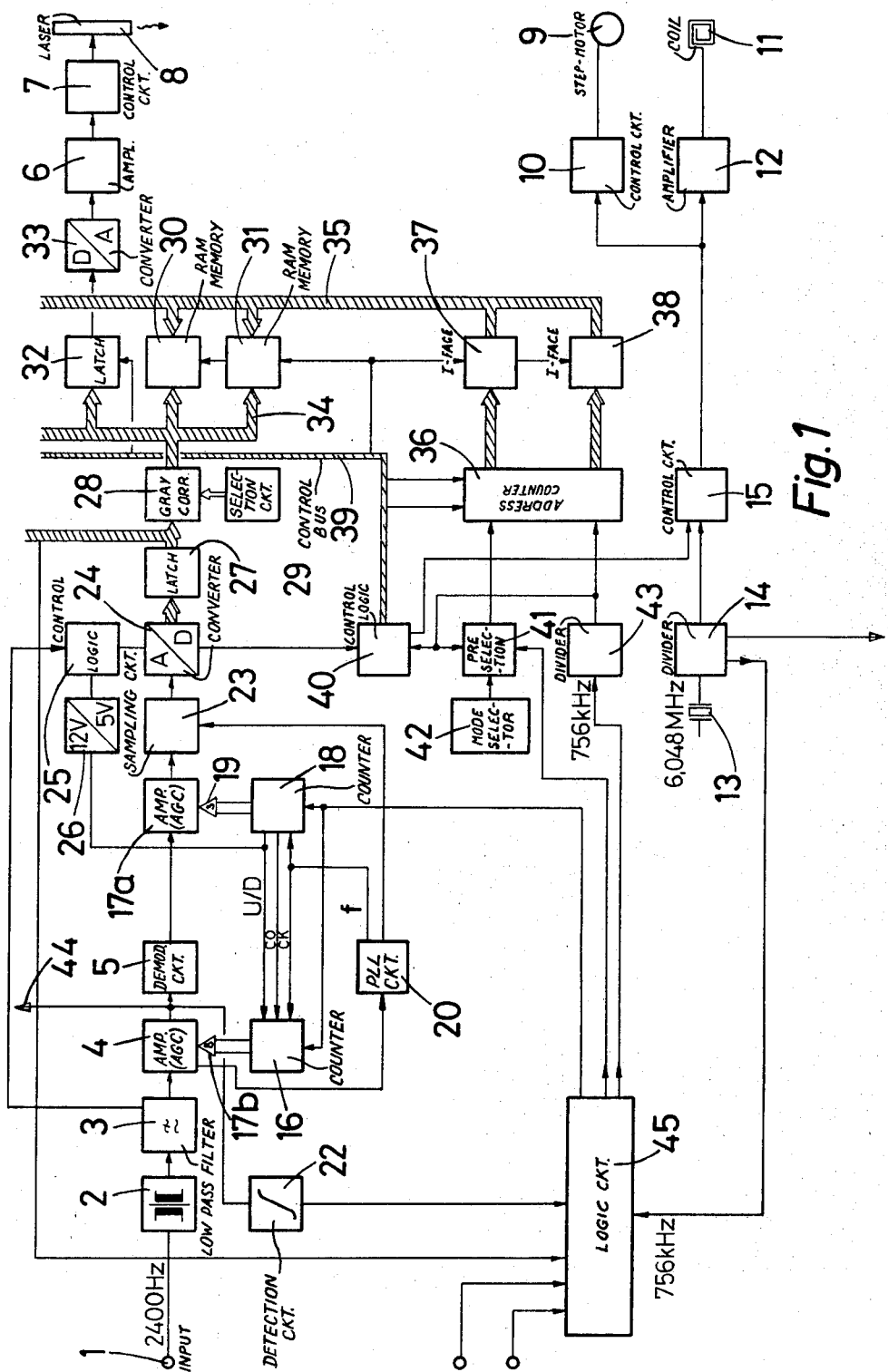
FIG. 1 is a circuit diagram of the embodiment of the invention.

The basic equipment of the apparatus corresponds to the HELL TM 4006 telephoto receiver comprising a laser. This receiver comprises an input for a video signal transmitted by a sub-carrier of 2,400 Hz which can be transmitted by telephone lines, an input circuit 2, a low-pass filter 3, a first amplifier 4 with automatic gain correction (AGC), a rectifier demodulation circuit 5 followed by a second AGC amplifier 17a, a signal amplifier 6 (on the right-hand side of the drawing), and an amplifier 7 controlling and modulating the intensity of a laser 8. The basic equipment also comprises a stepping motor 9 controlled by a control circuit 10, and a coil 11 controlled by an amplifier 12 for deflecting the laser beam, the circuits 10 and 12 being controlled by a clock circuit comprising a quartz oscillator 13 and a divider 14 through a control circuit 15. The TM 4006 apparatus is known per se and will not be described here in more detail. It will be recalled however that it uses a dry developing photographic paper which can be obtained in a roll having a width of 210 mm.

The AGC amplifiers 4 and 17a are associated with two up-down counters 16 and 18 which modify the gain by means of respectively eight and three switches 17b and 19 respectively switching eight and three resistors. The resolution of the correction of the gain is 0.021 dB. The gain correction does not take place only at the beginning of the image. Demodulation in the circuit 5 is accompanied by rectification of the negative alternations so that there are only positive alternations.

The output of the AGC amplifier 4 is also applied to a detection circuit (integrator) 22 which reacts to a modulation of 300 Hz of the input signal, a modulation which lasts for several seconds and precedes the arrival of an image. The circuit 22 controls the starting of the counters 16 and 18 through a logic circuit 45, the operation of which will be described hereafter. An U/D input connection is also provided between the up-down counters 16 and 18 which are connected in series, a CO signal ensuring the transfer of data from one to the other if one of the counters is full.

The signal leaving the AGC amplifier 17a is applied to a sampling circuit 23 controlled by a PLL circuit (phase locked loop) 20 which indicates maxima of the signal, i.e. the sampling instants. The circuit 20 also controls the advance of the counters 16 and 18 by providing a common clock signal CK having the frequency f. The circuit 23 retains the signals received from the amplifier 17a for the time necessary for the digital conversion of the sample by an analog/digital converter 24 controlled by a logic circuit 25 through a 12 V/5 V voltage converter 26. Sampling takes place every 208 $\mu$secs, coherent with the sub-carrier, and sampling lasts for 10 $\mu$secs. The analog/digital converter 24 transforms the analog signal received into words of 8 bits which are transmitted through a latch 27 to a circuit 28 for handling the grey areas of the image, making it possible to correct 256 different shades of grey. The logic circuit 28 has a programmable memory and can be programmed by means of a manual or remotely controlled selection circuit 29.

The essential part of the new device is constituted by two buffer memories 30 and 31 of the RAM type, i.e.

with direct or random access, connected in tandem and operating alternately in the mode "write" and "read". The signals read are transmitted by a latch 32 to a digital/analog converter 33, and the analog signal output of the converter 33 is amplified by the image amplifier 6 in order to modulate the laser. The memories 30 and 31 have a buffer capacity of 2 times 2 kbytes and an address capacity of 4 kbytes (addresses of 12 bits). The memories 30 and 31 and the latch 32 are connected to the circuit 28 and to each other by a data bus 34. The memories are also connected by an address bus 35 to an address counter circuit 36 through two interfaces 37 and 38 having three states, namely "read", "write", "authorisation". These interfaces control the multiplexing of the two memories 30 and 31 which operate in tandem, one filling up whilst the other is read and vice versa. The interfaces 37 and 38 as well as the memories 30 and 31 are connected to a control bus 39 transmitting the commands of a logic circuit 40 controlling the "read/write" functions, this logic circuit 40 itself being controlled by the analog/digital converter 24, as well as by a preselection logic circuit 41 associated with a mode selector 42 by which the user may select a normal or enlarged image. The clock signal is obtained through a divider circuit 43 receiving the clock signal from the divider 14 via logic circuit 45. By means of the circuits 41 and 42 it is possible to choose between recording or reading one line 2.n times and between recording or reading each elementary point n times, for example between reading or writing one line 2 or 4 times and each elementary point 1 or 2 times by passing from one of the memories 30, 31 to the other, with the aim of obtaining either a normal image or an image enlarged 2 times, as will be explained hereafter. The circuit 42 also makes it possible to choose between the enlargement of 3 vertical half images, namely the left-hand half or the right-hand half or a half-image taken in the central part. The logic circuit 42 thus determines the beginning of the image line for each of these cases and the memories 30 and 31 are addressed accordingly. The interfaces 37 and 38 address the correct memory.

All the buses may be connected in an optional manner to the interface of a computer or other external digital source. An output 44, taken from the output of the amplifier 4, is provided for recording the signal received on magnetic tape. The logic circuit 45 is a circuit for synchronization and identification of the type of image received, which makes it possible to adapt the circuit to receiving different types of images, such as the images transmitted on the one hand by a geostationary satellite METOSAT or a non-geostationary satellite such as the TIROS satellite. The circuit 45 counts the number of image points per line. The circuit 45 ensures synchronization by resetting the corresponding counter to zero. The circuit 45 is also intended to receive a signal for synchronizing the magnetic tape, at the time of reproduction of the image from the signal recorded on magnetic tape, in order to take into account the variation of the speed of the tape.

Figure 2:
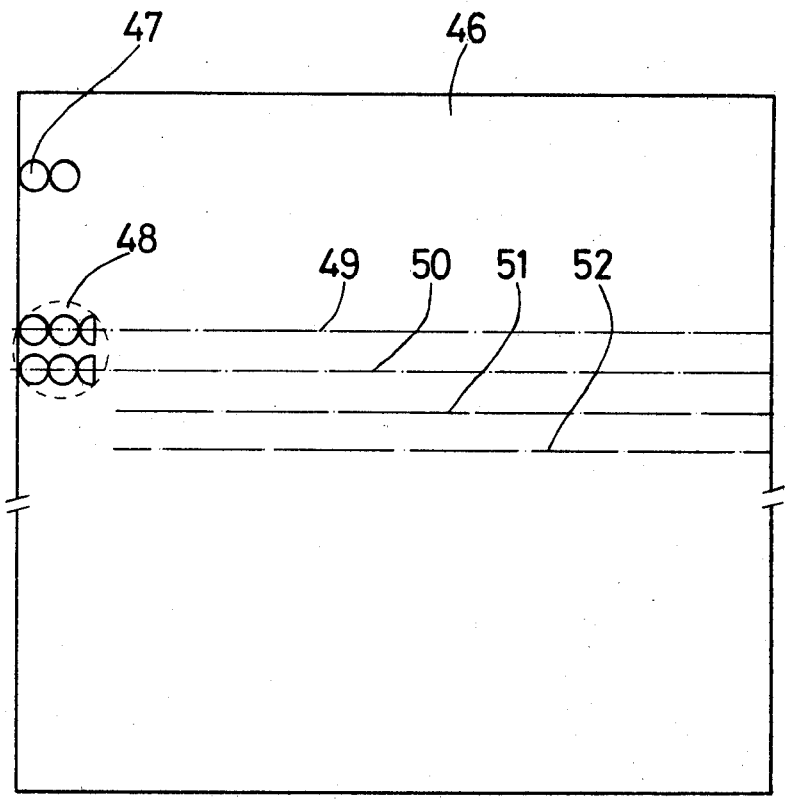
FIG. 2 shows diagrammatically the composition of an image area on photo-sensitive paper.

The formation of the image on the paper will be described by means of FIG. 2. The surface 46 represents a part of the web of photo-sensitive paper swept by the laser beam 8. The width used, which corresponds to the length of one line, is 211.2 mm and the resolution used is 2048 points per line, so that an elementary area 47 has a diameter of 0.1 mm. The image point 48 of a normal, non-enlarged image is constituted by 2 times 2½ elementary points reproducing a surface corresponding approximately to the surface area of the round spot of the observation beam emitted by the meteorological satellite. The image points of one line are repeated in the next line: the laser beam sweeps the paper a first time along a first line 49, recording 2048 elementary points, then the paper is entrained by a distance of 0.132 mm by the stepping motor 9 and the same elementary points are recorded on a second line 50. 800 image points are thus recorded. The paper is then advanced by a new step of 0.132 mm for recording a new line and so on. The recording of 2½ elementary points is of course only notional, since in reality only whole elementary points are recorded. The advance by a step of 0.132 mm is obtained by means of 12 steps of the stepping motor. Since the motor carries out 960 steps per second, the time necessary is thus 12.5 m secs. The storage of 2048 elementary points in the memory takes 250 m secs, whereas recording of the latter on the paper takes only 43 m secs. The return of the spot of the laser beam takes place in 16 m secs.

Figure 3:
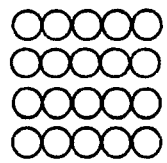
FIG. 3 shows diagrammatically how an image area enlarged two times is obtained.

In order to obtain an enlargement of two times, each line of elementary points is reproduced 4 times along the lines 49, 50, 51 and 52. Furthermore, each elementary point is reproduced twice in succession, so that the image area obtained in consequently constituted by twenty elementary points as illustrated in FIG. 3. Seen from left to right, this image area is thus constituted by two columns formed by eight identical points followed by two other columns formed by eight other identical points and by one column formed by four identical points. This is thus an enlargement of the image area 48. In view of the fact that the elementary points are repeated horizontally, it is possible to record only half of the 2048 elementary points of one line. The circuit 42 (FIG. 1) makes it possible to choose the left-hand half, the right-hand half, or the central half of the image. The circuit 42 thus determines if, in each of the memories, it is necessary to commence reading at the beginning of a line or a quarter or halfway along this line. It also determines if it is necessary to stop halfway or three-quarters way along or at the end of the stored line.

Generally, it is possible to obtain an enlargement of n times by repeating the elementary points in each line n times and by repeating the lines 2.n times.

The size of a normal image is 211 mm by 211 mm and that of an image enlarged 2 times is 211 mm by 422 mm. The maximum length is 500 mm.

The apparatus according to the invention is naturally not limited to the recording of images transmitted by satellites.

What is claimed is:

1. Apparatus for the photographic reception of images transmitted by means of a modulated electrical signal, comprising means for receiving and demodulating the electrical signal to provide an analog signal, a laser providing a beam of modulated intensity, and means for sweeping the beam across a photo-sensitive sheet driven by a stepping motor, characterised by means for sampling the analog signal to obtain samples representing elementary points, means for converting the samples into digital signals defining elementary points, memories for storing the digital signals, means for reading the stored digital signals from the memories, means for converting the read out digital signals into analog signals representing elementary points, means for modulating the laser with the analog signals representing elementary points, means for repeating the elementary points; said memories comprising two memories connected in tandem and controlled as a duplex arrangement, one memory filling up whilst the other is read and vice versa, and the memories being arranged to operate such that digital signals representing a line of points are stored once and reproduced 2.n times (n being a whole number other than 0), an image area being constituted by the repetition of 2 times 21/2 elementary points, and means provided for controlling the repetition of each elementary point n times horizontally and each line 2.n times to enlarge the image point n times.

2. Apparatus according to claim 1, characterised in that it comprises means for correcting the grey areas of the image, which means are constituted by a circuit having a programmable memory located before the memories.

3. Apparatus according to claim 2, characterised in that it comprises control, data and address lines which connectable directly to an external computer.

* * * * *